(12) United States Patent
Suman et al.

(10) Patent No.: US 9,665,758 B1
(45) Date of Patent: May 30, 2017

(54) ELECTROSTATIC DISCHARGE SHIELD FOR DATA READERS

(71) Applicant: Datalogic IP Tech S.r.l., Bologna (IT)

(72) Inventors: Michele Suman, Padua (IT); Davide Bruni, Bologna (IT); Stefano Balduini Montanari, Bologna (IT); Giuseppe di Bari, Bologna (IT)

(73) Assignee: Datalogic IP Tech S.R.L., Lippo di Calerara di Reno (IT)

( * ) Notice: Subject to any disclaimer, the term of this patent is extended or adjusted under 35 U.S.C. 154(b) by 0 days.

(21) Appl. No.: 15/227,372

(22) Filed: Aug. 3, 2016

(51) Int. Cl.
*G06K 7/10* (2006.01)
*G06K 19/02* (2006.01)

(52) U.S. Cl.
CPC ....... *G06K 7/10821* (2013.01); *G06K 19/022* (2013.01)

(58) Field of Classification Search
CPC ............ G06K 7/10; G06K 7/14; G06K 19/06; G06K 7/00; G06K 5/00; G06F 17/00; G03B 7/08

USPC ..... 235/454, 494, 375, 439, 462.24, 462.29, 235/462.43
See application file for complete search history.

(56) References Cited

U.S. PATENT DOCUMENTS

| | | | |
|---|---|---|---|
| 2006/0139440 A1* | 6/2006 | Tomita | B41J 2/473 347/225 |
| 2007/0199996 A1* | 8/2007 | He | G06K 7/12 235/462.43 |

* cited by examiner

*Primary Examiner* — Edwyn Labaze
(74) *Attorney, Agent, or Firm* — Stoel Rives LLP

(57) ABSTRACT

Disclosed systems and methods for a data reader having an ESD shield with integrated optical characteristics to improve illumination features of the data reader. The data reader includes an illumination module configured to generate illumination, and an ESD shield having high ESD resistance for protecting electronic and other sensitive components of the data reader. The ESD shield further includes a reflective interior surface and a spatial filter, where the reflective surface and filter together are operable to provide a uniform distribution of illumination along the body of the data reader.

17 Claims, 3 Drawing Sheets

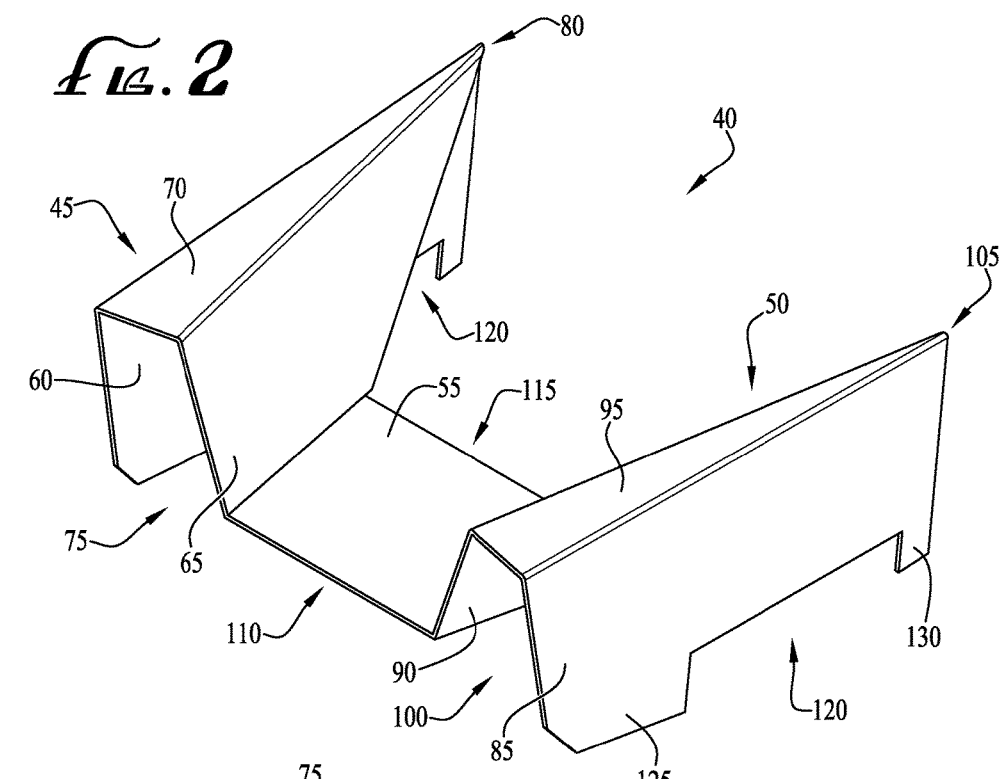
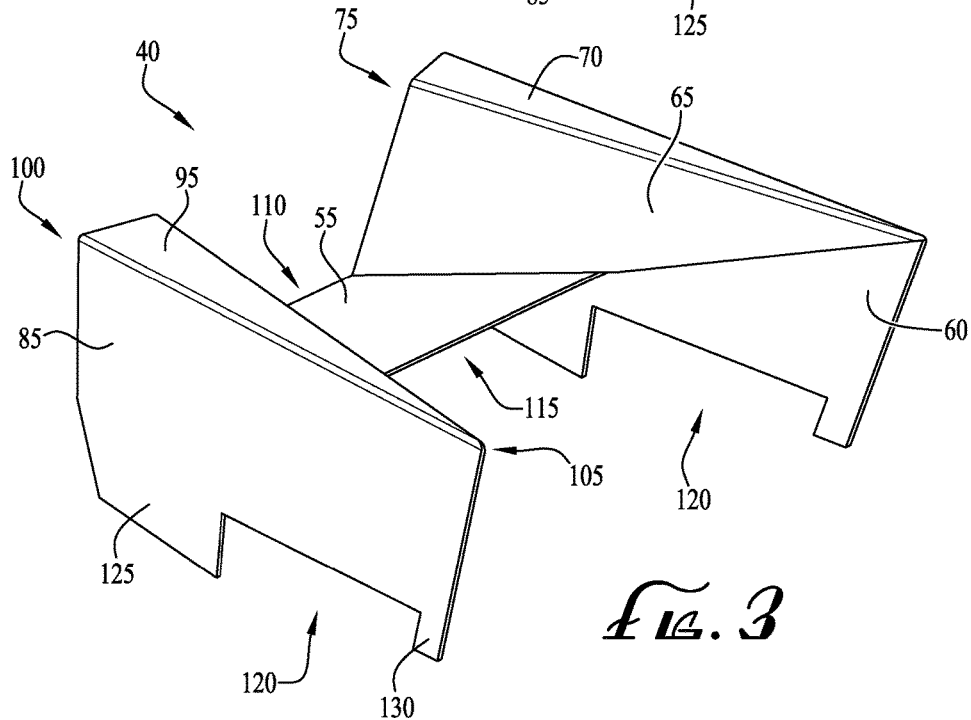

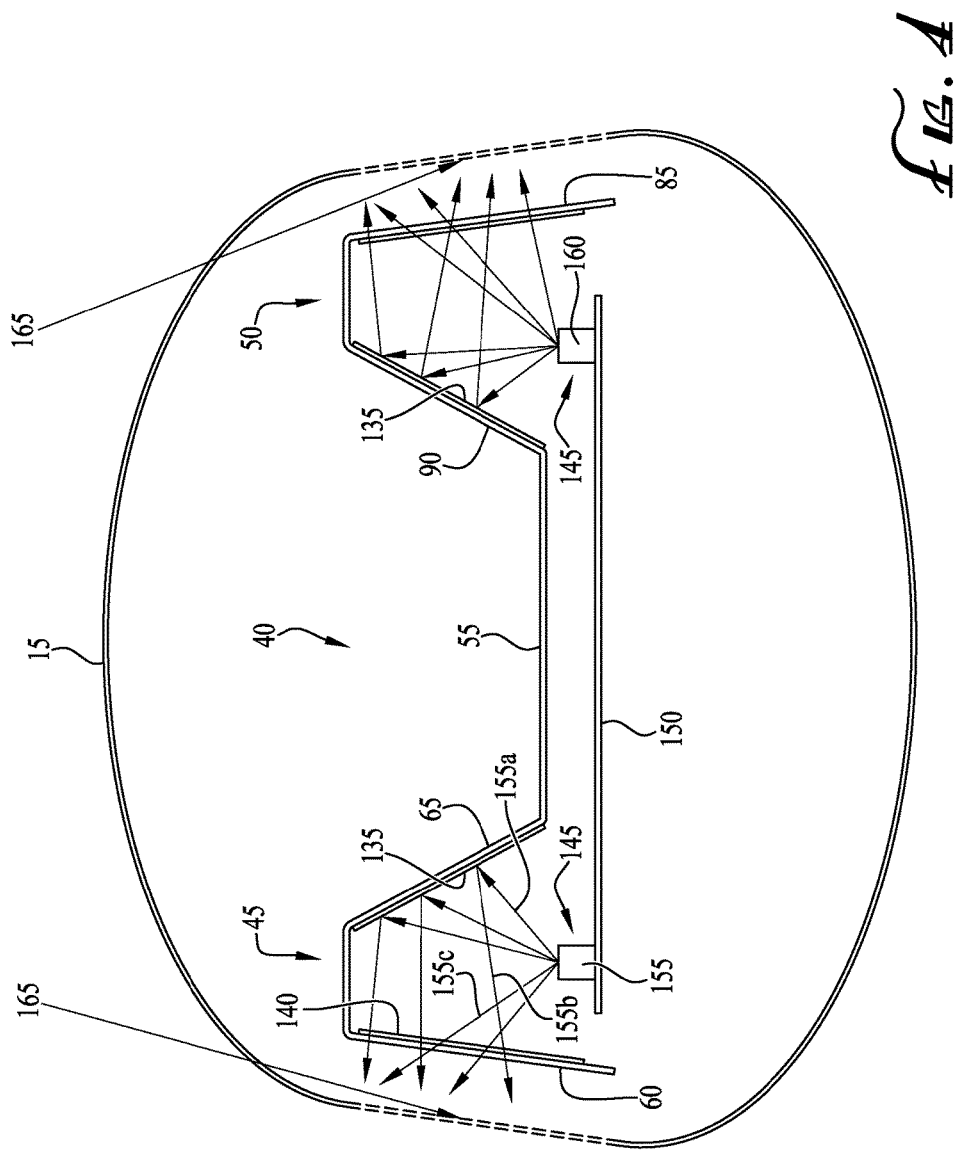

ELECTROSTATIC DISCHARGE SHIELD FOR DATA READERS

BACKGROUND

The field of the disclosure relates generally to data readers, and in particular, to electrostatic discharge shields configured for protecting electronic and other sensitive components of handheld or mobile data readers.

Electrostatic discharge (ESD) typically occurs when an object has an imbalance in its electric charge that may be due to a charge transfer between objects with differing electrostatic potential. Typically, an ESD event causes rapid charge movement and heating, which may lead to damage of surrounding electronics and other sensitive components depending on the severity of the event. For example, in some cases, the ESD event may result in catastrophic damage, where the device entirely ceases to function. In other cases, the event may cause latent damage, where the device operates somewhat normally for a period of time, but performance is compromised and the device fails before its expected shelf-life. For data readers and other measurement devices, latent damage may be more problematic because it may go unnoticed for some time and lead to inaccurate readings and measurements during use.

Conventional electronic devices incorporate ESD shields and other similar protection devices to limit electrostatic buildup and protect sensitive components. Typically, the size of an ESD shield correlates to its resistance performance, with larger ESD shields offering greater ESD resistance. However, since handheld data readers are typically small, it is particularly challenging to develop a data reader with high ESD resistance while using a compact ESD shield to provide sufficient space to accommodate other components of the data reader.

The present inventors have therefore recognized a need for improved ESD shields for handheld data readers. In addition, the present inventors have recognized a potential advantage for a streamlined design of such ESD shields to include secondary optical functionalities to optimize the limited space in such devices. Additional aspects and advantages will be apparent from the following detailed description of example embodiments, which proceeds with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIGS. 2 and 3 are perspective views of an ESD shield for protecting electronic components of the data reader of FIG. 1.

FIG. 4 is a schematic representation of an internal housing of the data reader of FIG. 1 illustrating an example arrangement of the ESD shield.

DETAILED DESCRIPTION OF EXAMPLE EMBODIMENTS

Figure 1:
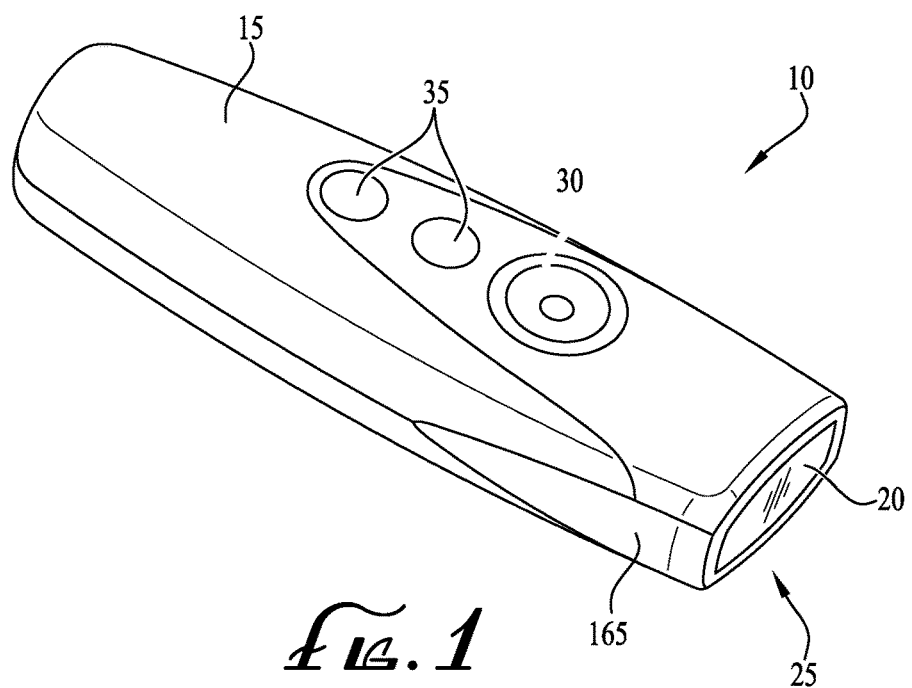
FIG. 1 is a perspective view of a handheld data reader according to one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Collectively, FIGS. 1-4 illustrate embodiments of a data reader 10 that may be used to capture optical codes, such as barcodes or other machine-readable indicia, in a variety of applications. For example, optical codes can be used in a retail setting to identify a class of objects (e.g., merchandise) or in the healthcare field to identify patient records and files, or in a business setting to identify unique items (e.g., patents). As a result, optical codes are found on a wide variety of objects, such as retail goods, company assets, and documents. As is further described in detail below with reference to the figures, the data reader 10 includes an ESD shield 40 capable of providing high ESD resistance to protect the electronic components of the data reader 10, with the ESD shield 40 also supporting a reflector 135 and a spatial filter 140 to improve optical/lighting capabilities of the data reader 10. Additional details of these and other embodiments of the data reader 10 are described herein with reference to the figures.

FIG. 1 is a perspective view of a data reader 10 in accordance with a first embodiment. With reference to FIG. 1, the data reader 10 is depicted as a hand-held portable data reader suitable for reading codes, symbols, or other indicia affixed or marked on objects. The data reader 10 includes a body 15 with a scan window 20 disposed at a forward end 25 of the data reader. The housing 15 may include a trigger button 30 operable to initiate a data reading process for an optical code located in a field of view of the data reader 10. In some embodiments, the body 15 of the data reader 10 may include additional actuatable buttons 35 that allow the user to select or toggle different options of the data reader 10. It should be understood that while the data reader 10 is illustrated as a small hand-held data reader in the figures, in other embodiments, the data reader 10 may be configured as a fixed unit (mountable to a support surface or free standing on a horizontal surface) or may be a combined handheld/fixed unit (e.g., one that may rest/be self-supporting upon a horizontal surface but be grasped by the user and moved to aim toward an item to be read.

As mentioned previously, data readers and other electronic devices often experience electrostatic discharge (ESD) events that may compromise or damage the data reader. Accordingly, conventional data readers typically include an ESD shield or other similar protection devices to help avoid ESD events and protect the integrity of the device. With reference to FIGS. 2-4, the following sections describe an improved ESD shield 40 designed to provide high ESD resistance for the data reader 10, and to also optimize the illumination pattern provided by an illumination system 145 of the data reader 10. Example embodiments of the ESD shield 40 and the illumination system 145 are described in further detail below with reference to FIGS. 2-4.

FIGS. 2 and 3 illustrate front and rear perspective views, respectively, of an example embodiment of an ESD shield 40. FIG. 4 schematically illustrates an example arrangement of the ESD shield 40 within the data reader 10. With particular reference to FIGS. 2 and 3, the ESD shield 40 may be comprised of a static dissipative material, such as ABS, acetal, polycarbonate, polypropylene, or other suitable materials, including other engineering plastics. In some embodiments, the shield 40 may be configured to have a high ESD resistance of at least 10 KV. In other embodiments, the shield 40 may have an ESD resistance of at least 16 KV or more.

As illustrated in the figures, the ESD shield 40 includes a first housing 45 and a second housing 50, the housings 45, 50 (also referred to as bonnets) connected to one another by a planar base 55. With particular reference to FIG. 2, the first housing 45 includes an outer wall 60 and an inner wall 65 with a substantially planar top wall 70 extending between the walls 60, 65 and connecting the upper ends of the walls 60, 65 to one another. The walls 60, 65 may slope or slant downwardly from the top wall 70, with the inner wall 65 extending downwardly toward the base 55, thereby providing the housing 45 with a generally truncated pyramid-shape cross-section (see FIG. 4). The housing 45 is open at a front end 75, with the inner wall 65 angled relative to the outer wall 60 such that the walls 60, 65 converge from the front end 75 toward the rear of the housing 45 to form a closed rear end 80. In such embodiments, the top planar wall 70 has a wider width proximal to the front end 75 of the housing 45, with the width of the wall 70 gradually narrowing/tapering toward the rear end 80, thereby forming a generally pyramid shape for the top wall 70 from the front end 75 to the rear end 80.

The second housing 50 may include the same or substantially similar configuration as the first housing 45. In particular, the second housing 50 includes an outer wall 85 and an inner wall 90 with a substantially planar top wall 95 extending between the walls 85, 90 and connecting the upper ends of the walls 85, 90 to one another. The walls 85, 90 may slope or slant downwardly from the top wall 95, thereby providing the housing 50 with a generally truncated pyramid-shape cross-section. The housing 50 is open at a front end 100, with the inner wall 90 angled relative to the outer wall 85 such that the walls 85, 90 converge from the front end 100 toward the rear of the housing 50 to form a closed rear end 105. In such embodiments, the top planar wall 95 has a wider width proximal to the front end 100 of the housing 50, with the width of the wall 95 gradually narrowing/tapering toward the rear end 105, thereby forming a generally pyramid shape for the top wall 95 from the front end 100 to the rear end 105.

As noted previously, the shield 40 includes a substantially planar base 55 connecting the housings 45, 50. In some embodiments, the base 55 may extend from a bottom portion of the inner wall 65 of the first housing 45 to the bottom portion of the inner wall 90 of the second housing 50. A front end 110 of the base 55 is adjacent the respective front ends 75, 100 of the housings 45, 50, with the base 55 extending rearwardly toward a rear end 115. In some embodiments, the rear end 115 is offset from the respective rear ends 80, 105 of the housings 45, 50 such that the base 55 has a length shorter than the length of the respective top walls 70, 95 of the housings 45, 50. In some embodiments, the angles and dimensions of the walls and other exterior features of the first and second housings 45, 50 may be identical to one another. In other embodiments, one or more of the angles and dimensions of the walls may be different as between the first and second housings 45, 50 for various reasons, such as to accommodate the geometry and size of the data reader 10, or to accommodate placement of electronics or other components of the data reader 10, for example.

As illustrated in FIGS. 2-3, the housings 45, 50 each further include a recessed section 120 formed on a bottom portion of the respective outer walls 60, 85, where the recessed section 120 creates relief spacing to avoid mechanical interference between the ESD shield 40 and other components of the data reader 10, such as the PCB 150 (see FIG. 4). In addition, the housings 45, 50 further include a front tab 125 adjacent the respective front ends 75, 100 and a rear tab 130 adjacent the respective rear ends 80, 105, where the tabs 125, 130 may be used to secure the shield 40 in position within the housing of the data reader 10.

In some embodiments, the shield 40 may further include reflectors 135 (or other suitable reflective surface) to optimize the illumination generated by the illumination module 145 of the data reader 10. For example, with particular reference to FIG. 4, an interior surface of the inner wall 65 may include a reflector 135 disposed thereon. The reflector 135 may comprise any one of a variety of suitable materials. For example, in one embodiment, the reflector 135 may be created by covering the inner wall 65 with a deposited reflective coating (similar to a flashlight reflector, e.g., silver, aluminum, etc.), or the interior surface of the inner wall 65 may be covered with a reflective membrane, such as Vikuti™ Enhanced Specular Reflector manufactured by 3M of St. Paul, Minn., or aluminized Mylar®. Other suitable materials may be used to make reflectors 135, for example, Miro® reflective surfaces manufactured by Alanod of Ennepetal, Germany, or metals that can be polished to an appropriate level of reflectivity. In other embodiments, reflectors 135 may include a Lambertian or substantially Lambertian reflective surface, in other words, a surface that reflects light isotropically or substantially isotropically.

The reflective properties of the reflectors 135 may be described as to its ability/property to reflect and absorb light. In some embodiments, the reflectors 135 may be highly reflective surfaces having an 80-90% efficient reflectivity, and a 10-20% absorbance. In other embodiments, the reflectors 135 may have different reflective properties depending on the desired level of illumination for the data reader 10.

The shield 40 may also include a spatial filter 140 to control light transmission passing through the diffusive or transparent surfaces 165 of the data reader 10. For example, in one embodiment, the spatial filter 140 may be disposed along an interior surface of the outer wall 60. The spatial filter 140 may be obtained by printing a plurality of black dots on the interior surface of the outer wall 60, where the black dots block light from passing through the outer wall 60, while any empty spaces allow the light to pass through the wall 60. Accordingly, the transmittance of the spatial filter 140 may be varied by changing the density of the dots (i.e., increased dot density decreases light transmittance or decreased dot density increases light transmittance), thereby defining the amount of light that passes through the outer wall 60. Preferably, the dot size is sufficiently small so as to not be visible in the light pattern exiting the data reader 10 and detected by the human eye.

In some embodiments, the illumination module 145, such as an LED, may produce a generally non-uniform light pattern that may be more intense in a generally forward direction and less intense along the sides of the module 145, essentially creating a high-intensity spot effect that may appear as a single point light source to a user. To help mitigate this effect, the transmittance of the spatial filter 140 may be arranged to create a gradient effect that will block a higher percentage of the more intense illumination (i.e., to cut the central field of the LED radial emission) and block a comparatively lower percentage of the less intense illumination (i.e., to preserve the external field of the LED radial emission) to create a generally homogenous light pattern exiting from the data reader 10. For example, the spatial filter 140 may have the lowest transmittance in the regions at which the highest intensity light from the illumination module 145 is directed (e.g., directly in front of the module 145), and the highest transmittance in the regions of low light intensity (e.g., the left and right sides of the module 145). Accordingly, a central portion of the spatial filter 140 may have the lowest transmittance, and the transmittance properties may increase moving away from the center of the spatial filter 140 to the opposite ends.

In other embodiments, the spatial filter 140 may be partially diffusive (such as by using white dots instead of or in addition to the black dots) or may be partially reflective (such as by using silver dots instead of or in addition to the black dots) to reflect the light back to the reflectors 135 and back out again through the surfaces 165 of the data reader 10.

FIG. 4 is a schematic representation of the data reader 10 revealing internal electronic and illumination components thereof. With reference to FIG. 4, the data reader 10 includes a main printed circuit board (PCB) 150 with various circuitry including microprocessor(s), memory, battery component, Bluetooth modules, imager modules, and other electronics. In the illustrated embodiment, the circuitry components are illustrated as disposed on a common PCB 150, but separate PCBs may alternately be implemented.

In addition, the PCB 150 further includes one or more illumination modules 145, such as laser emitting diodes (LEDs) for providing the desired illumination field. In other embodiments, other types of light generators/sources may be used depending on desired illumination characteristics. For example, different types of light generators may emit light in different directional patterns. Incandescent lamps and gas-discharge lamps commonly emit light omni-directionally, with the exception of areas blocked from emitting light such as socket portions of the lamps. Many LEDs emit light in a spatial distribution, for example, a spatial distribution of 120°. Lenses or other optic devices may be included with an LED to change the spatial distribution, for example, by narrowing the spatial distribution to a viewing angle of 60° or 30° or some other desired viewing angle.

With reference to FIG. 4, the following describes additional details of the shield 40 as mounted within the data reader 10 to improve shielding capabilities and optimize illumination. With reference to FIG. 4, the shield 40 is positioned over the PCB 150, with the first housing 45 generally overlaying an LED source 155 of the illumination module 145, and the second housing 50 generally overlaying another LED source 160 of the illumination module 145. Once the shield 40 is in position, the reflectors 135 are disposed relative to the LED sources 155, 160 to reflect light toward the spatial filters 140, where the light is directed out through a diffusive surface 165 of the data reader 10.

For example, illumination generated by the LED source 155 may include a first light segment 155a directly sidewardly to the reflector 135, where the light segment 155b is redirected toward the spatial filter 140. Some of the light segment 155b passes through the spatial filter 140 and exits the diffusive surface 165 of the data reader 10. Depending on the characteristics of the spatial filter 140, the light that does not exit the spatial filter 140 may be redirected back toward the reflector 135 or may otherwise be diffused. The illumination generated by the LED source 155 may include various light segments that are directed to the reflector 135 and redirected toward the spatial filter 140 through which the light segments may exit the diffusive surface 165. In other embodiments, since the illumination from the LED source 155 may be dispersed widely, some illumination, such as light segment 155c may travel directly through the spatial filter 140 and out the diffusive surface 165 without first traveling to the reflector 135. Although not described in detail to avoid repetition, it should be understood that the illumination from LED source 160 may travel in a similar pattern within the second housing 50 to provide the desired illumination profile for the data reader 10.

Accordingly, as described, the shield 40 provides ESD shielding to protect the electronic components and other sensitive components of the data reader 10. In addition, the shield 40 further includes reflectors 135 and filters 140 positioned in relation to the illumination modules 145 to optimize the illumination pattern generated by the illumination module 145 and emitted from the data reader 10.

It is intended that subject matter disclosed in any one portion herein can be combined with the subject matter of one or more other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reader comprising:
   a reader housing including electronic components of the data reader;
   an illumination module disposed in the reader housing, the illumination module including a plurality of illumination sources configured to generate illumination;
   a transmissive surface disposed on the reader housing and configured to transmit therethrough the illumination generated by the illumination module; and
   a shield configured for protecting the electronic components of the data reader from electrostatic discharge, the shield comprising a shield housing of a generally cone-shaped structure having a first wall, a second wall, and a top wall extending between the first and second walls, the first wall including a reflective surface disposed on an interior portion thereof and configured to reflect the illumination from the illumination module toward a filter, the filter disposed on an interior portion of the second wall and configured to block a first portion of the reflected illumination and to allow at least a second portion of the reflected illumination to pass therethrough and toward the transmissive surface of the reader housing,
   wherein the shield is arranged over the illumination module such that the shield housing overlays at least one of the plurality of illumination sources, and wherein illumination generated by the at least one of the plurality of illumination sources is reflected by the reflective surface of the first wall toward the filter of the second wall and transmitted through the transmissive surface of the data reader.

2. The data reader of claim 1, wherein the shield further includes a second shield housing of a generally cone-shaped structure having a third wall, a fourth wall, and a top wall extending between the third and fourth walls, wherein the third wall includes a reflective surface on an interior portion thereof and the fourth wall includes a filter on an interior portion thereof.

3. The data reader of claim 2, wherein the second shield housing is arranged over the illumination module such that the second shield housing overlays a second one of the plurality of the illumination sources, wherein illumination generated by the second one of the plurality of the illumination sources is reflected by the reflective surface of the third wall toward the filter of the fourth wall and transmitted through the transmissive surface of the reader housing.

4. The data reader of claim 2, wherein the first housing and the second housing are connected to one another by a shield base extending from the first wall of the first housing to the third wall of the second housing.

5. The data reader of claim 4, wherein the shield is formed as a singular, integral component.

6. The data reader of claim 1, wherein the first wall and the second wall are each sloped downwardly from the top wall.

7. The data reader of claim 6, wherein the shield further includes a substantially planar base, and wherein the first wall slopes downwardly from the top wall to the base.

8. The data reader of claim 1, wherein the shield is configured to provide a resistance of at least 16 KV.

9. A method for data reading comprising the steps of:
  passing an object to be read through a scan region in front of a window of a data reader;
  generating illumination from an illumination module disposed in a reader housing of the data reader;
  reflecting the illumination from the illumination module by a reflective surface disposed on an interior portion of a shield housing configured for protecting electronic components of the data reader from electrostatic discharge, the shield housing comprised of a generally cone-shaped structure having a first wall, a second wall, and a top wall extending between the first and second walls, the reflective surface positioned on an interior portion of the first wall; and
  filtering the illumination reflected from the reflective surface by a filter positioned on an interior portion of the second wall, the filter configured to block a first portion of the illumination from the illumination module and to allow a second portion of the illumination from the illumination module to pass therethrough.

10. The method of claim 9, wherein the shield further includes a second shield housing of a generally cone-shaped structure having a third wall and a fourth wall, and a top wall extending between the third and fourth walls, wherein the third wall includes a reflective surface on an interior portion thereof and the second wall includes a filter on an interior portion thereof, the method further comprising the steps of:
  reflecting the illumination from the illumination module by the reflective surface disposed on the third wall; and
  filtering the illumination reflected from the reflective surface of the third wall by the filter positioned on the fourth wall.

11. The method of claim 10, wherein the shield further includes a substantially planar base connecting the first and second shield housings.

12. The method of claim 11, wherein the shield is formed as a singular, integral component.

13. A shield for protecting electronic components of a data reader, the shield comprising:
  a first shield housing of a generally truncated cone-shaped structure having a first wall, a second wall, and a top wall extending between the first and second walls, wherein the first wall includes a reflective surface on an interior portion thereof and configured to reflect illumination generated by an illumination module of the data reader, and the second wall includes a filter on an interior portion thereof, the filter configured to block a first portion of the illumination from the illumination module and allow a second portion of the illumination from the illumination module to pass therethrough;
  a second shield housing of a generally cone-shaped structure having a third wall, a fourth wall, and a top wall extending between the third and fourth walls, wherein the third wall includes a reflective surface on an interior portion thereof configured to reflect illumination generated by an illumination module of the data reader, and the fourth wall includes a filter on an interior portion thereof, the filter configured to block a first portion of the illumination from the illumination module and to allow a second portion of the illumination from the illumination module to pass therethrough; and
  a substantially planar base connecting the first and second housings, the base extending from the first wall of the first housing to the third wall of the second housing.

14. The shield of claim 13, wherein the shield is formed as a singular, integral component.

15. The shield of claim 13, wherein the first wall and the second wall of the first housing are each sloped downwardly from the top wall.

16. The shield of claim 13, wherein the third wall and the fourth wall of the second housing are each sloped downwardly from the top wall.

17. The shield of claim 13, wherein the shield is configured to provide a resistance of at least 16 KV.

* * * * *